US008572604B2

(12) United States Patent
Dong (10) Patent No.: US 8,572,604 B2
(45) Date of Patent: Oct. 29, 2013

(54) METHOD AND APPARATUS TO SUPPORT VIRTUALIZATION WITH CODE PATCHES (75) Inventor: Yaozu Dong, Shanghai (CN)

(73) Assignee: Intel Corporation, Santa Clara, CA (US)

(*) Notice: Subject to any disclaimer, the term of this patent is extended or adjusted under 35 U.S.C. 154(b) by 1972 days.

(21) Appl. No.: 10/581,334

(22) PCT Filed: Nov. 12, 2005

(86) PCT No.: PCT/CN2005/001909
§ 371 (c)(1),
(2), (4) Date: May 31, 2006

(87) PCT Pub. No.: WO2007/053980
PCT Pub. Date: May 18, 2007

(65) Prior Publication Data
US 2008/0282241 A1 Nov. 13, 2008

(51) Int. Cl.
G06F 9/455 (2006.01)

(52) U.S. Cl.
USPC .................................................. 718/1

(58) Field of Classification Search
USPC .................................................. 718/1
See application file for complete search history.

(56) References Cited

U.S. PATENT DOCUMENTS

| 5,437,033 | A | 7/1995 | Inoue et al. |
| 5,522,075 | A | 5/1996 | Robinson et al. |
| 7,210,144 | B2* | 4/2007 | Traut .............................. 718/1 |
| 2002/0053072 | A1 | 5/2002 | Lodewijk et al. |
| 2006/0026385 | A1* | 2/2006 | Dinechin et al. ............. 711/210 |
| 2006/0026387 | A1* | 2/2006 | Dinechin et al. ................. 712/1 |

FOREIGN PATENT DOCUMENTS

| CN | 1561485 | 1/2005 |
| WO | 2007/053980 A1 | 5/2007 |

OTHER PUBLICATIONS

International Search Report and Written Opinion received for PCT Application No. PCT/CN2005/001909, mailed on Aug. 24, 2006, 9 pages.
Afterburning and the Accomplishment of Virtualization—http://14ka.org/projects/virtualization/afterburn/whitepaper.pdf, Apr. 6, 2005.
vBlades: Optimized Paravirtualization for the Itanium Processor Family—http://www.usenix.org/events/vm04/tech/full_papers/magenheimer/magenheimer_html/, Aug. 30, 2006.
Intel Virtualization Technology Specification for the Intel Itanium Architecture (VT-i) ftp://download.intel.com/technology/computing/vptech/30594202.pdf, Apr. 2005.

* cited by examiner

Primary Examiner — Gregory A Kessler
(74) Attorney, Agent, or Firm — Trop, Pruner & Hu, P.C.

(57) ABSTRACT

A processing system executes an emulation patch for a guest virtual machine (VM) of the processing system. In one embodiment, the emulation patch includes data to facilitate identification of a routine to emulate a guest instruction. After executing the emulation patch for the guest VM, the processing system may use the data to find an emulation routine for emulating the guest instruction. The processing system may transfer control from the guest VM to a virtual machine monitor (VMM) in response to execution of the emulation patch, without saving a trap frame. The VMM may then find and execute the emulation routine for the guest instruction without decoding the guest instruction. A break instruction with an immediate value, for example, may be used for the emulation patch. The immediate value may be used for finding the emulation routine. Other embodiments are described and claimed.

20 Claims, 3 Drawing Sheets

METHOD AND APPARATUS TO SUPPORT VIRTUALIZATION WITH CODE PATCHES

CROSS-REFERENCE TO RELATED APPLICATION

This application is a National Phase application of, and claims priority to, International Application No. PCT/CN2005/001909, filed Nov. 12, 2005, entitled "METHOD AND APPARATUS TO SUPPORT VIRTUALIZATION WITH CODE PATCHES".

FIELD OF THE INVENTION

The present disclosure relates generally to the field of data processing, and more particularly to methods and related apparatus for supporting virtual machines in a data processing system.

BACKGROUND

As recognized in Revision 2.0 of the INTEL® Virtualization Technology Specification for the INTEL° ITANIUM® Architecture (VT-i), dated April 2005 (hereinafter "the VT-I Specification"), conventional operating system (OS) designs typically assume the OS has complete and direct control of hardware and system resources. The OS implements the policies to manage these resources to allow multiple user-level applications to be run. The goal of virtualization is typically to allow multiple instances of OSs to be run on a system. The OSs can be same or different versions, and can come from different OS vendors.

In a typical virtualized environment, there will be a piece of system software responsible for virtualizing the hardware and system resources to allow multiple instances of the OSs to be run. The software component that provides such functionality is referred to herein as the virtual machine monitor (VMM). The VMM is typically a piece of host software that is aware of the hardware architecture.

For each instance of guest OS, the VMM creates and presents a virtual machine (VM) to the guest OS. From the perspective of a guest OS, the VM includes all the hardware and system resources (e.g., processors, memory, disk, network devices, etc.) expected by the guest OS. From the VMM perspective, these hardware and system resources are "virtualized."

For example, a VMM may create a VM that presents two logical processors to one guest OS, and a VM that presents one logical processor to another guest OS. The actual underlying hardware, however, may include less than, equal to, or greater than three physical processors. The logical processors presented to a guest OS are called virtualized processors. Likewise, VMs may include virtualized storage, peripherals, etc.

The VT-i Specification and a corresponding specification dated April 2005 for the IA-32 INTEL® architecture (the VT-x Specification) may be obtained from the URL located at http:- -www.intel.com-technology-computing-vptech-, where the "/" character has been replaced in the URL with the "-" character to avoid an active hyperlink from within this document.

Virtualized environments include fully virtualized environments, as well as paravirtualized environments. In a fully virtualized environment, each guest OS operates as if its underlying VM is simply an independent physical processing system that the guest OS supports. Accordingly, the guest OS may expect or require the VM to behave according to the architecture specification for the supported physical processing system. By contrast, in paravirtualization, the guest OS helps the VMM to provide a virtualized environment. Accordingly, the guest OS may be characterized as virtualization aware. For instance, a paravirtualized guest OS may be able to operate only in conjunction with a particular VMM, while a guest OS for a fully virtualized environment may operate on two or more different kinds of VMMs.

A VMM may use emulation to perform certain operations on behalf of a guest OS. For instance, the guest OS may include an instruction to access a register. However, since the register will reside in a virtualized processor, the VMM may need to emulate the access for the guest OS.

One approach for supporting virtualization involves hardware assistance or acceleration for emulating guest operations. However, certain types of processors may lack the control logic needed to provide hardware assistance for virtualization, and other types may provide hardware assistance to emulate some guest operations but not all guest operations or instructions that need to be emulated.

When hardware assistance is not available or not sufficient to handle all emulation requirements, other approaches may be used, including emulation techniques that use code patches which cause interrupts, exceptions, faults, and the like (referenced generally hereinafter as faults). For example, to facilitate emulation of certain operations, a VMM may apply patches to insert new code into code being executed by a VM. Specifically, the patches may augment or replace existing code. For instance, the VMM may replace old code with new code while keeping with original code size, so that it is not necessary to relocate the whole binary. Each patch, when executed, may cause the processing system to generate a fault.

For purposes of this disclosure, the term "emulation patch" refers to a patch that is applied to code of a guest VM, to facilitate the emulation of operations for the guest VM. Emulation patches may be applied statically or dynamically. To handle a fault triggered by an emulation patch, a conventional processing system saves and eventually restores the contextual data that defines or constitutes the system state for the guest VM. That contextual data may be called the trap frame.

An emulation patch may include or consist of a pseudo instruction. For purposes of this disclosure, a pseudo instruction is an instruction that is undefined or that includes an invalid argument or value. Consequently, when a pseudo instruction from an emulation patch (i.e., a patched pseudo instruction) is executed, it will trigger a fault (e.g., an illegal operation fault). Reserved fields or other special instructions may be used as pseudo instructions.

According to conventional approaches for supporting virtualization, each of the emulation patches, when executed, may cause the processing system to save and restore the trap frame. It may be necessary to save the trap frame because some or all of the software used to handle emulation of the guest instruction may have been written in a high level language, such as C. Unfortunately, saving and restoring the trap frame may take many hundreds of instruction cycles.

In addition, as described below, an exception handler in the VMM may perform a complex series of operations to determine which guest instruction corresponds to the pseudo instruction that caused the fault, and to then emulate that guest instruction. Consequently, conventional emulation patches may have a significant impact on performance.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

In a conventional virtualization environment, when an emulation patch is executed, it may be necessary to perform complex operations to determine which guest instruction is to be emulated. For instance, the emulation patch may use a pseudo instruction that provides some information about the original guest instruction, but that pseudo instruction may not describe all necessary characteristics of the guest instruction. Consequently, the VMM may need to retrieve the original guest instruction to determine additional characteristics of that instruction, such as the source register (if any), the target register (if any), the branch register (if any), etc.

Furthermore, the executing guest may only have an instruction side translation lookaside buffer (TLB), and the VMM may be unable to directly retrieve code from data side memory. The VMM may therefore need to internally track the guest's TLB to be able to get the physical address for the guest instruction to be emulated. The VMM may then need to retrieve that instruction in physical mode, rather than virtual mode, or insert a new data side TLB entry. For example, a VMM may use the following general approach to determine characteristics for the guest instruction to be emulated:

1. Get the guest instruction pointer (guest_IP) from an interrupt instruction pointer (IIP) of a control register (CR).
2. Try to find the translation in the guest instruction side (I side) TLB that cover the address guest_IP.
3. Insert a new entry in the data side (D side) TLB, based on the instruction from the I side TLB found in step #2. The new entry may match the old entry precisely, or the new entry may include minor changes. For instance, the I side entry may have an "execute only" attribute, but the D side entry may be given a "readable" attribute for the VMM ring (e.g., ring 0).
4. Read the instruction: ins=*(guest_IP).
5. Remove the translation of step #3.

In addition or alternatively, as indicated above, the VMM may transition the processing system from virtual mode to physical mode to retrieve the instruction. Furthermore, after retrieving the guest instruction to be emulated, the VMM may consume substantial processing resources determining how to emulate that instruction.

To facilitate code development and maintenance, or for other reasons, the routine or routines for determining how to emulate guest instructions may have been written in a high level language, such as C. The nature of those routine may make it necessary for the VMM to save the trap frame before calling those routines, and to restore the trap frame after those routines have executed.

In a virtualized environment, the above approach may be practical to emulate complicated instructions, such as "return from interruption" (rfi) for example. However, for many virtualization events, the techniques described below provide a more efficient way to support emulation of guest operations or instructions.

Figure 1:
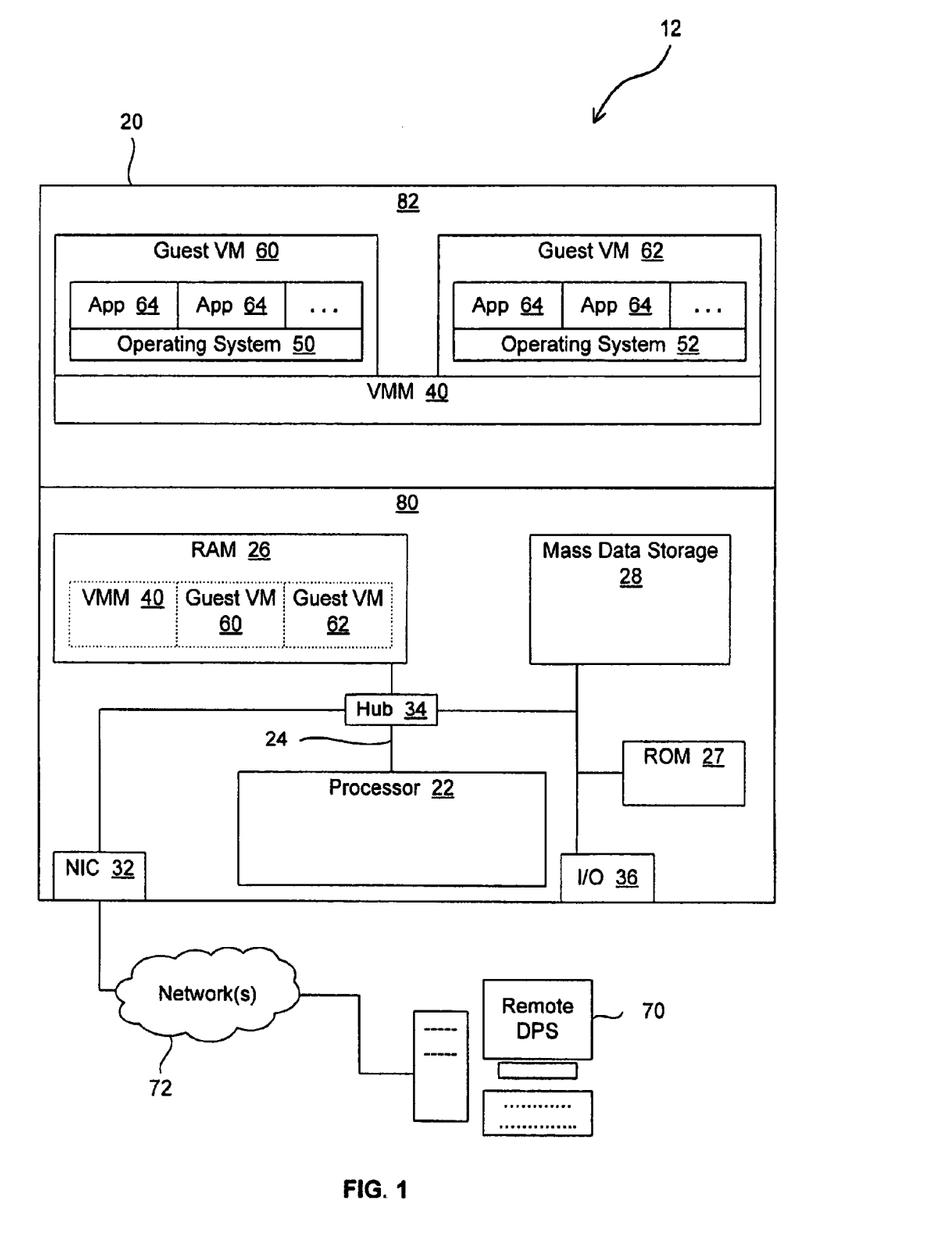
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, at least one processor or central processing unit (CPU) 22 communicatively coupled to various other components via one or more system buses 24 or other communication pathways or mediums.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Processing system 20 may also respond to directives received from other processing systems or other input sources or signals. Processing system 20 may utilize one or more connections to one or more remote data processing systems 70, for example through a network interface controller (NIC) 32, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processor 22 may be communicatively coupled to one or more volatile or non-volatile data storage devices, such as random access memory (RAM) 26, flash memory 27, mass storage devices 28 such as integrated drive electronics (IDE) or small computer system interface (SCSI) hard drives, and/or other devices or media, such as floppy disks, optical storage, tapes, read-only memory (ROM), memory sticks, compact flash (CF) cards, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, SCSI controllers, network controllers, universal serial bus (USB) controllers, input/output (I/O) ports 36, input devices such as a keyboard, a mouse, a camera, etc. Processing system 20 may also include one or more bridges or hubs 34, such as a memory controller hub, an I/O controller hub, a peripheral component interconnect (PCI) root bridge, etc., for communicatively coupling system components. As used herein, the term "bus" includes pathways that may be shared by more than two devices, as well as point-to-point pathways.

Some components, such as NIC 32, for example, may be implemented as adapter cards with interfaces (e.g., a PCI connector) for communicating with a bus. Alternatively, NIC 32 and other devices may be implemented as embedded controllers, using components such as programmable or non-programmable logic devices or arrays, application-specific integrated circuits (ASICs), embedded computers, smart cards, and the like.

The invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" is used in general to cover a broad range of software constructs, including applications, routines, modules, drivers, subprograms, processes, and other types of software components.

For instance, data storage device 28 and/or RAM 26 may include various sets of instructions which, when executed, perform various operations. Such sets of instructions may be referred to in general as software.

As illustrated in FIG. 1, in the example embodiment, the programs or software components 82 may include a VMM 40. As described in greater detail below with regard to FIG. 2, VMM 40 may include various programs and data structures for patching code for VMs, and for handling patched VM code.

Is illustrated in FIG. 1, VMM 40 may create VMs such as VM 60 and VM 62. Different instances of guest OSs, such as guest OS 50 and guest OS 52, may execute in those VMs. Also, various applications 64 may execute on top of each guest OS. The data associated with VMM 40 and VMs 60 and 62 may be stored in any suitable storage device or devices. For instance, much or all of that data may reside in RAM 26. However, portions of the data (e.g., state data, control logic, etc.) may reside in registers, cache, or any other suitable location in processor 22.

Figure 2:
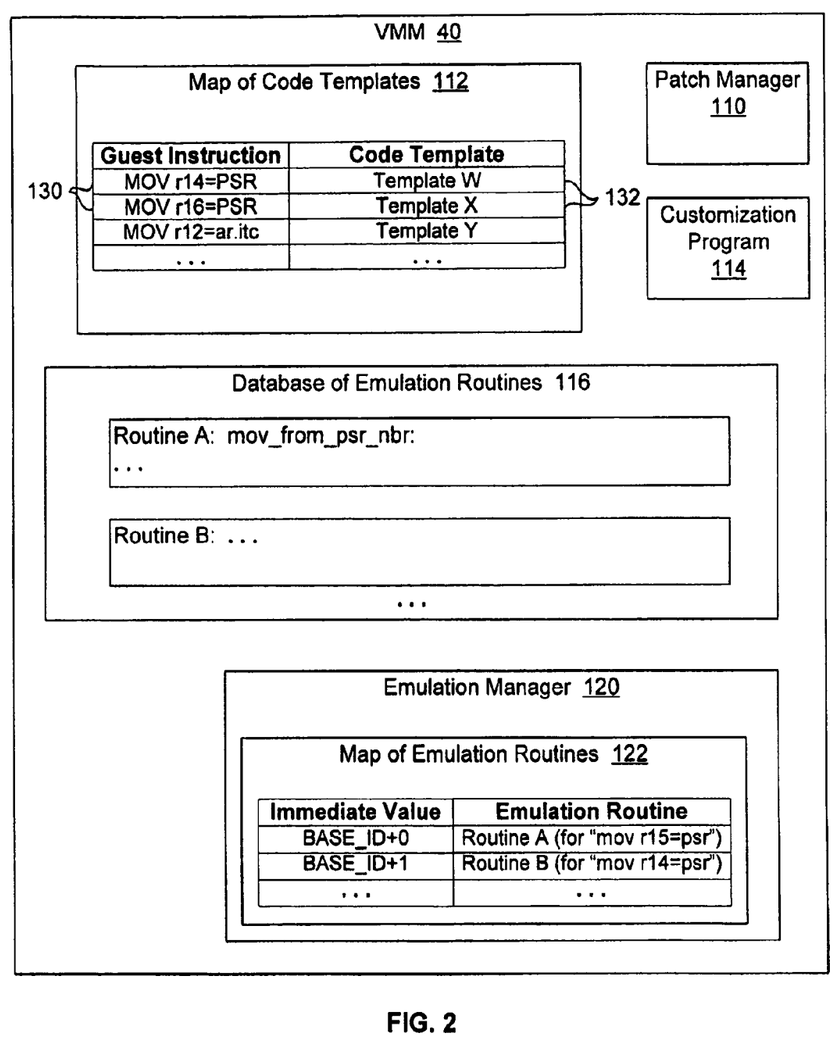
FIG. 2 is a block diagram depicting the example VMM of FIG. 1 in greater detail.

FIG. 2 is a block diagram depicting VMM 40 in greater detail. As illustrated, in the example embodiment, VMM 40 includes a patch manager 110 and an emulation manager 120. As described in greater detail below, when the VMs execute programs, patch manager 110 dynamically inserts patches into those guest programs to support virtualization. Alternatively, VMM 40 or a different software module may insert the patches statically, in anticipation of execution of the guest programs. The inserted patches may include break instructions or other instructions that cause execution to shift from the guest program to another program, such as VMM 40. For purposes of this disclosure, such instructions may be referred to as emulation triggers. The inserted patches may replace or augment certain instructions in the guest programs. The inserted patches may also be referred to as binary patches.

As described below, emulation manager 120 provides for execution of programs to emulate the guest instructions that have been patched by patch manager 110.

Patch manager 110 may determine which instructions to patch based on a collection of information that (a) lists the guest instructions to be patched and (b) identifies code templates that may be used to generate instructions or procedures for emulating those guest instructions. That collection of information may be structured as one or more tables, or as any other suitable data structure(s). In the example embodiment, such a collection of information is depicted in FIG. 2 as code template map 112.

As indicated above, code template map 112 may include a predetermined list of instructions to be patched. A small set of example instruction entries is depicted as instructions 130 in FIG. 2. Typically, the list will include privileged instructions and other instructions that VMM 40 must emulate for guest OSs, due to the virtualized nature of the environment within which the guest OSs operate. For example, the list of instructions to patch may include, without limitation, instructions such as the following:

- instructions to copy data from a PSR to a register that does not reside in a register bank (e.g., MOV r14=PSR);
- instructions to copy data from a PSR to a register that resides in a register bank (e.g., MOV r16=PSR);
- instructions to copy data from an interval time counter (itc) application register (ar) to a register that does not reside in a register bank (e.g., MOV r12=ar.itc);
- instructions to copy data from an interval time counter (itc) application register (ar) to a register that resides in a register bank (e.g., MOV r18=ar.itc);
- instructions to set the system mask (ssm) or reset the system mask (rsm) for the interrupt collection (IC) or alignment checking (AC) bits of the PSR;
- instructions to set or reset the system mask for the interrupt enable bit of the PSR (PSR.i);
- instructions to copy data from the task priority register (TPR);
- instructions to copy data into the TPR;
- instructions to copy data from the interrupt control register (ICR);
- instructions to copy data into the ICR;
- instructions to copy data from a CPU identification (CPUID) register;
- instructions to switch register banks (bsw);
- cover instructions;
- translation hashed entry address (THASH) or translation hashed entry tag (TTAG) instructions;
- instructions to copy data from a region register (RR);
- instructions to copy data into an RR;
- instructions to copy data from an interval timer match (ITM) register or a default control register (DCR);
- instructions to copy data into an ITM register or a DCR;

In various embodiments, various subsets or supersets of these instructions may be included in the predetermined list of instructions to be patched. Other embodiments also may not include the above instructions, but may include one or more other instructions, whether similar or not to the instructions listed above. The number of different guest code instructions to be patched may be varied for any particular implementation, as may the number of different code templates to be used, depending on factors such as how much performance improvement is desired, and how much time and manpower is available for creating code templates. In one embodiment, emulation patches are not applied based merely on the type of guest instruction, but based on a predetermined list of specific instructions to be patched. In addition, in one or more embodiments, the VMM may sometimes decide not to patch an instruction, even though the instruction appears on the list of patchable instructions. For instance, the list of patchable instructions may include a b-unit instruction, but when the VMM encounters that b-unit instruction, the VMM may determine, based on any suitable operating parameters of the processing system, not to patch the instruction, but instead to let it fall back to a more or less conventional guest instruction emulation routine.

Code template map 112 may also identify or provide various reference code templates 132. As described in greater detail below, in the example embodiment, each code template 132 may provide an outline containing example instructions or instruction templates to be used as the basis for the actual emulation instructions or routines to be executed in place of the guest instructions being emulated.

VMM 40 may also include one or more programs for building emulation routines. In FIG. 2, the program or programs for generating emulation routines are depicted in general as customization program 114. To generate an emulation routine, customization program 114 may determine which of the reference code templates 132 corresponds to the instruction to be emulated. Customization program 114 may then modify or "fix up" that template as necessary to emulate the particular operations specified in the instruction to be emulated. Accordingly, the customization program(s) may be referred to in general as fix-up logic. For instance, when generating an emulation routine, customization program 114 may customize a reference code template as necessary, based on characteristics of the instructions to be emulated, such as the particular source and target registers named in that instruction, for example. VMM 40 may store the emulation routines that it generates using any suitable data structure(s). FIG. 2 illustrates various emulation routines, such as Routine A and Routine B, for example, stored in an emulation routine database 116.

An instruction typically includes a mnemonic (e.g., "insert translation cache (ITC)") and one or more operands (e.g., "r1"). To emulate guest instructions, a VMM may consider all instructions with the same mnemonic to be the same type of instruction. For instance, all guest instructions that use the mnemonic for "ITC" may be considered to have the same type. For all instructions that have the same type, the VMM may use the same patch.

However, VMM 40 may consider the mnemonic and one or more operands when classifying instructions by type. For example, as indicated above, if two instructions use the same mnemonic but different types of registers (e.g., banked versus non-banked), VMM 40 may consider those two instructions to be different types of instructions.

In some embodiments, VMM 40 may consider additional attributes of a guest instruction when determining how to patch that instruction. For instance, VMM 40 may apply different emulation patches, depending on the slot from which each instruction executes. For example, a guest instruction of "rsm PSR.i" in slot 0 may get one emulation patch, while that same instruction in slot 1 may get a different emulation patch. Different emulation patches may be needed so they can set the correct return slot in PSR.ri, for example. Similarly, if a VM uses (a) one instruction that includes the "mov" mnemonic together with a certain destination register and (b) another instruction that includes the same mnemonic but a different destination register, VMM 40 may insert a different patch for each of those two different instructions. Thus, VMM 40 may apply different patches for different instructions, based on differences in the mnemonics, any one or more of the operands (e.g., a source register, a destination register, or an immediate value), the slots associated with the instructions in the guest bundles, or any other suitable attribute or combination of attributes of the instructions. In particular, instructions may be considered to be different instructions if any attributes are not the same. However, if two instructions only differ in their location within the guest program, the same patch may be used to patch both of those instructions.

In the example embodiment, processing system 20 uses an architecture in which instructions are grouped into bundles before execution. Table 1 below illustrates two example bundles, with each bundle including three guest instructions (in slots 0-2) and a field to indicate the type of template used by the bundle. The template may specify the type of unit (e.g., I, M, B, F, or X) to be found in each slot. For instance, a bundle with an "MMI" template may have an M-unit instruction, an M-unit instruction, and an I-unit instruction in slots 0-2, respectively.

TABLE 1

Example Instruction Bundle, Before Patch

| Slot 0 | Slot 1 | Slot 2 | Template |
|---|---|---|---|
| Instruction 1 | mov r14 = PSR | Instruction 3 | MMI |
| Instruction 4 | mov r15 = PSR | Instruction 6 | MMI |

In Table 1, the first bundle includes an instruction to move the value of the PSR to application register r14, and the second bundle includes a similar instruction but with the destination register of r15. VMM 40 may patch each of those "mov_from_PSR" instructions with a different patch.

For instance, as illustrated in the first row of Table 2 below, VMM 40 may replace the guest instruction having the destination register of r14 with a break instruction having a particular immediate value (e.g., BASE_ID+0, where BASE_ID is any suitable base value). As shown in the second row, VMM 40 may replace the guest instruction having the destination register of r15 with a break instruction having a different immediate value (e.g., BASE_ID+1). The patches shown in slot 1 may be considered emulation triggers.

TABLE 2

Example Instruction Bundle, After Patch

| Slot 0 | Slot 1 | Slot 2 | Template |
|---|---|---|---|
| Instruction 1 | break.m BASE_ID + 0 | Instruction 3 | MMI |
| Instruction 4 | break.m BASE_ID + 1 | Instruction 6 | MMI |

When different patches are used for each different instruction, emulation manager 120 VMM may not need to retrieve the corresponding guest instruction, and may determine how to emulate that guest instruction in a very simple manner. For instance, emulation manager 120 may determine which emulation routine is needed by simply using the immediate value from the patch as an index into emulation routine map 122. Emulation manager 120 may obtain the patch's immediate value from an interrupt immediate control register (cr.iim), for example. Alternatively, a patch may include an address, a label, or any other suitable type of data to be used for locating the corresponding emulation routine. For example, an emulation patch may use a branch instruction that identifies the entrance of the desired emulation routine (e.g., br_patch_function_0). In one embodiment, emulation manager 120 retrieves the immediate value from cr.iim for a break.m/i/f/x instruction, and emulation manager 120 uses a combination of the guest_IP address (cr.iip) and the region identifier (RID) to locate the emulation routine for a break.b instruction.

Consequently, the code in emulation manager 120 for determining how to emulate patched guest instructions need not be overly complex, and may be written in a low level programming language such as assembly. Therefore, VMM 40 may use patches that do not require heavyweight context switches.

In one embodiment, there is one emulation routine for each virtual processor (VP). Alternatively, there may be one emulation routine per VMM. In the latter case, the emulation routine may obtain additional information to identify the current VP.

In addition, in one embodiment, VMM 40 uses the break instruction in some or all emulation patches, but with different immediate values used for different guest instructions. As depicted in emulation routine map 122, each immediate value may correspond to a particular one of the emulation routines in database 116. The immediate value for each emulation routine may be assigned by customization program 114 when customization program 114 creates that emulation routine.

Also, since the break instruction can be executed in I, M, B, F, or X units, patch manager 110 may insert a patch into a bundle with any template without changing the template of that bundle. Also, emulation manager 120 may obtain the immediate value from the cr.iim register or use any other suitable approach, as described above. The immediate values may thus distinguish each different emulation routine. Also, VMM 40 may reserve a predetermined range of immediate values (e.g., from BASE_ID to BASE_ID+RESERVED_NUM) for use in patches.

Furthermore, customization program 114 may use a low level language such as assembly for some or all of the emulation routines. For example, when generating an emulation routine to emulate a guest instruction of "mov_from_PSR," customization program 114 may write that emulation routine in assembly. Some or all emulation routines also may use only scratch bank 0 registers for internal variables.

In FIG. 2, emulation routine map 122 associates Routine A with the immediate value BASE_ID+0. Customization program 114 may have created Routine A to emulate a guest mov_from_PSR instruction involving a non-banked target register. The following lines provide one example of a pseudo code representation of Routine A, which may be executed by VMM 40 to emulate a guest mov_from_PSR instruction in guest slot 1 involving a non-banked target register:

```
mov_from_psr_nbr:
/*
* b0 and pr are destroyed before entering this function
*/
    vpsr = vpd.vpsr
    vpsr = (vpsr & ~UM_BITS) | (machine PSR & UM_BITS)
                    // depend on virtualization policy. UM_BITS: User
                       mask bits
    vpsr.ri = 1      // Slot1 is patched
    R15 = vpsr       // emulation result of "mov r15=psr"
    machine PSR.ri =2   // point to next slot
    if ( vpsr.ic ) cr.iipa = cr.iip   // update iipa, depend on virtualization
    policy
    restore b0 and PR
    rfi
```

When guest execution hits an emulation patch, emulation manager 120 takes control and executes the above mov_from_psr_nbr program if the immediate value in cr.iim matches the index for that program in emulation routine map 122 (or, if cr.iim=0, if a combination of the guest_IP and RID matches the index for that program). In other embodiments, such as an embodiment using a different VMM, a different routine may be used to emulate the same guest instruction or a similar guest instruction.

The following lines provide a pseudo code representation of some of the logic in emulation manager 120:

```
Break_Instruction:
    save b0 and PR
    if ( cr.iim within reserved break immediate ) {
        goto patching_function_entry[cr.iim - BASE_ID]
            // mov_from_psr_nbr( ) in this example; see pseudo code
```

-continued

```
    above
    }
    else if ( cr.iim == 0 && (cr.iip & rid match entry in
       database of emulation
routines) ) {
        Goto patching_function found.
    }
    else {
        restore b0 and PR
        execute normal break interruption handler
    }
```

In one embodiment, break instructions are used as the emulation triggers. However, in other embodiments, other types of instructions may be used to cause execution to shift from the guest program to another program, such as VMM 40. In various embodiments, for emulation triggers, patch manager 110 may use instructions such as branch, jump, goto, break, call, and other instructions designed to cause interrupts, faults, exceptions, traps, or other transfers of control from one program to another. For instance, in one embodiment, instructions of the form "jmp addr_n" can be used as emulation triggers, where the value of addr_n differs for different emulation routines, to support emulation processing in a manner similar to the approach discussed above (with a "break m" trigger leading to use of a lookup database, leading to execution of an emulation routine that corresponds to the "break m"). The transfers of control, faults, and/or related operations or events that are caused by an emulation patch may be referred to in general as emulation trigger events. For purposes of this disclosure, the term "flow control instruction" is used to refer to call instructions, jump instructions, branch instructions, and any similar types of instructions.

Figure 3:
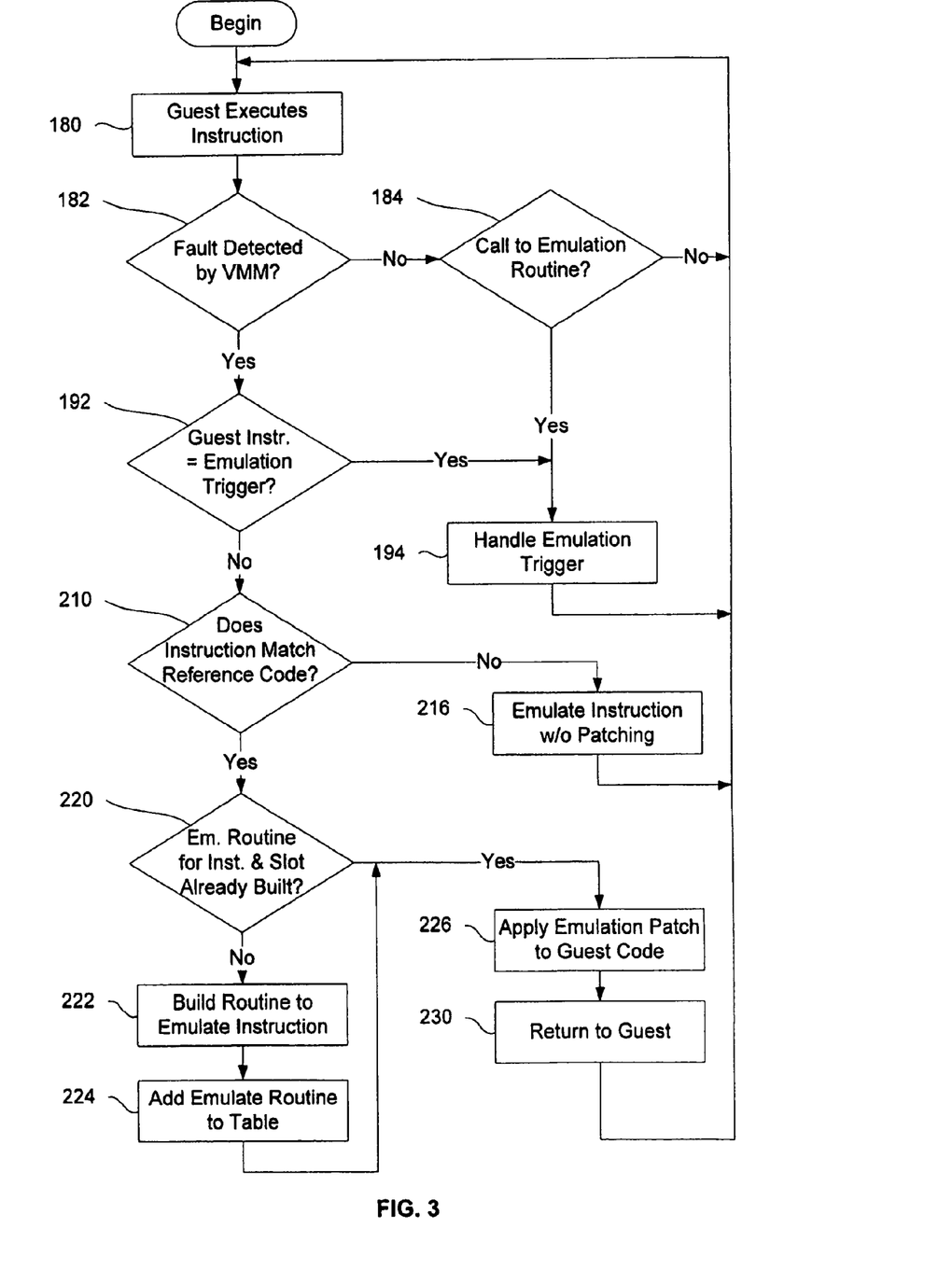
FIG. 3 is a flowchart depicting various aspects of a process to support virtualization with code patches according to an example embodiment of the present invention.

FIG. 3 is a flowchart depicting various aspects of a process to support virtualization with code patches according to an example embodiment of the present invention. The process depicted in FIG. 3 begins with one or more guest VMs, such as guest VM 60, executing in processing system 20. At block 180, guest VM 60 executes an instruction. As indicated at blocks 182 and 184 and the arrow returning to block 180, if the instruction did not cause a virtualization fault and it was not a call to an emulation routine, guest VM 60 may retain control and may continue executing instructions. However, if the guest instruction was a flow control instruction transferring control to an existing emulation routine, the instruction may be considered an emulation patch or trigger. Processing system may handle that trigger as depicted at block 194 and described below.

If the guest instruction did generate a fault, emulation manager 120 may then determine whether the guest instruction was an emulation patch or trigger, as indicated at block 192. For example, emulation manager 120 may determine that the instruction was an emulation trigger if the instruction was a break instruction that used one of the immediate values that were reserved for use in emulation patches, as described above. Alternatively, emulation manager 120 may determine whether the immediate value matches one of the values that have already been assigned to a particular emulation routine. Or, if cr.iim=0, emulation manager 120 may determine whether a combination of the guest_IP and RID matches one of the values that have already been assigned to an emulation routine.

If the guest instruction was an emulation trigger, the process may pass to block 194, where emulation manger 120 may handle the emulation trigger. For instance, emulation manager 120 may cause processing system 20 to execute the emulation routine that corresponds to the emulation trigger. That emulation routine may include any suitable set of instructions for emulating the original guest instruction. Upon completion of the emulation routine, VMM 40 may return control to VM 60, as indicated by the arrow returning to block 180 from block 194. For instance, as indicated above, the emulation routine may end with an rfi instruction. Alternatively, any other suitable technique may be used to return control to the guest VM. If block 194 was reached in response to a virtualization fault, VMM 40 may increment the guest_IP before returning control to guest VM 60. If block 194 was reached in response to a call to an emulation routine, VMM 40 may not need to increment the guest_IP, because it may already have been incremented.

If emulation manager 120 determines at block 192 that the guest instruction was not an emulation trigger, patch manager 110 may determine whether the guest instruction that caused the fault matches any of the instructions 130 for which code templates 132 are available, as indicated at block 210. If the guest instruction is not found among instructions 130, VMM 40 may use any suitable methodology to emulate the instructions without patching, as indicated at block 216. For instance, VMM 40 may use emulation code written in C to emulate the guest instruction, and VMM 40 may increment the guest_IP before returning control to the VM.

However, referring again to block 210, if the guest instruction is found among instructions 130, patch manager 110 may conclude that the guest instruction is to be patched. As indicated at block 220, patch manager 110 may then determine whether an emulation routine has already been built for the guest instruction in question, for instance based on the routines already stored in emulation routine database 116. Patch manager 110 may treat two guest instructions as different instructions, such that each will have a different emulation routine, if those instructions differ in any pertinent attribute, as indicated above. In particular, in some circumstances, the same emulation routine may be used for the same instruction in different slots, while other emulation routines may be used for only a single slot. As depicted at blocks 222 and 224, if patch manager 110 has not already built an emulation routine for the present guest instruction, patch manager 110 may build a routine to emulate the guest instruction, and may store that routine in any suitable location(s) in any suitable data structure(s) (e.g., in emulation routine database 116). As described above, customization program 114 may use a suitable code template from a collection of templates, such as those depicted in code template map 112, to generate the emulation routine.

After generating an emulation routine or determining that a suitable emulation routine already exists, patch manager 110 may insert an emulation patch into the guest code, as depicted at block 226. For example, if customization program 114 generated Routine A to provide for emulation of the guest instruction, and if Routine A was the first emulation routine to be generated, patch manager 110 may insert an emulation patch such as "break BASE_ID+0" into the guest code, in place of the original guest instruction.

As indicated at block 230, VMM 40 may then return control to the guest VM without incrementing the instruction pointer, so that the guest VM will then execute the emulation trigger. In another embodiment, VMM 40 may determine whether the context is appropriate for executing the patch and, if it is, VMM 40 may execute the patch on behalf of the guest VM. As described above, when the emulation patch is executed, it may trigger a fault or other type of event that affects the flow of execution. VMM 40 may then handle the emulation trigger, as depicted at block 194 and described above. The process of FIG. 3 may then return to block 180, and processing system 20 may resume execution of instructions from guest VM 60.

In alternative embodiments, instead of or in addition to using dynamic patching, a VMM may use static patching to replace guest instructions with emulation triggers. For instance, before loading an OS into a guest VM, the VMM may analyze the code image for the OS and may replace one or more of the original instructions with emulation triggers, based on a predetermined list of instructions to be patched. Many details of the patching operations may be the same or similar to the operations described above with regard to dynamic patching.

In accordance with the above description, embodiments of the present invention may allow processing systems to provide instruction emulation for guest VMs in a manner that is more efficient than conventional approaches. For instance, according to the present disclosure, it may be unnecessary for the VMM to (a) retrieve the guest instructions being emulated or (b) save and restore a trap frame.

In light of the principles and example embodiments described and illustrated herein, it will be recognized that the described embodiments can be modified in arrangement and detail without departing from such principles. Also, although the foregoing discussion has focused on particular embodiments, other configurations are contemplated as well. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for supporting virtual machines in a data processing system, the method comprising:
   automatically determining whether a guest instruction of a guest virtual machine (VM) of a processing system is to be patched for emulation, based at least in part on a list of instructions to be patched, the list of instructions stored in a template map that further stores code templates;
   retrieving a code template from the template map that corresponds to the guest instruction to be patched, the code template including an instruction template;
   generating an emulation routine for emulating the guest instruction, including modifying the code template based on characteristics of the guest instruction, storing the emulation routine in an emulation database, assigning a value to the emulation routine, and storing an association of the emulation routine with the value in an emulation map;
   executing an emulation patch for the guest instruction, the emulation patch including data to facilitate identification of the emulation routine for emulating the guest instruction;
   in response to execution of the emulation patch, transferring control from the guest VM to a virtual machine monitor (VMM) without saving contextual data that defines a system state for the guest VM; and
   using the data from the emulation patch to access the emulation map to find the emulation routine for the guest instruction.

2. A method according to claim 1, wherein the operation of executing an emulation patch comprises executing an instruction that includes an immediate value to be used for finding the emulation routine, wherein instruction replaces a second instruction including a register and not including the immediate value.

3. A method according to claim 1, wherein the operation of executing an emulation patch comprises executing a flow control instruction, wherein the flow control instruction includes an address to be used for finding the emulation routine, the flow control instruction selected from a group consisting of:
   a call instruction;
   a jump instruction; and
   a branch instruction.

4. A method according to claim 1, wherein the operation of executing an emulation patch comprises executing an instruction selected from the group consisting of:
   a break instruction;
   a branch instruction;
   a call instruction; and
   a jump instruction.

5. A method according to claim 1, further comprising:
   determining an index, based at least in part on data produced by the emulation patch; and
   using the index into the emulation map to find the emulation routine to be executed.

6. A method according to claim 1, further comprising:
   automatically determining whether the guest instruction is to be patched for emulation, based at least in part on a list of instructions to be patched, wherein the guest instruction resides in a slot of an instruction bundle;
   retrieving a code template that corresponds to the guest instruction to be patched; and
   generating the emulation routine for emulating the guest instruction, based at least in part on the code template and on the slot containing the guest instruction.

7. A method according to claim 1, further comprising:
   in response to execution of the emulation patch, finding and executing the emulation routine for the guest instruction without decoding the guest instruction.

8. A processing system to support virtual machines, the processing system comprising:
   a processor;
   a machine-accessible medium responsive to the processor; and
   instructions in the machine accessible medium, wherein the instructions, when executed by the processing system, cause the processing system to perform operations comprising:
   automatically determining whether a guest instruction of a guest virtual machine (VM) of the processing system is to be patched for emulation, based at least in part on a list of instructions to be patched, the list of instructions stored in a template map that further stores code templates;
   retrieving a code template from the template map that corresponds to the guest instruction to be patched, the code template including an instruction template;
   generating an emulation routine for emulating the guest instruction, including modifying the code template based on characteristics of the guest instruction, storing the emulation routine in an emulation database, assigning a value to the emulation routine, and storing an association of the emulation routine with the value in an emulation map;
   executing an emulation patch for the guest instruction, the emulation patch including data to facilitate identification of the emulation routine for emulating the guest instruction;
   in response to execution of the emulation patch, transferring control from the guest VM to a virtual machine monitor (VMM) without saving contextual data that defines a system state for the guest VM; and
   using the data from the emulation patch to access the emulation map to find the emulation routine for the guest instruction.

9. A processing system according to claim 8, wherein the emulation patch comprises an instruction with an immediate value, the immediate value to be used for finding the emulation routine.

10. A processing system according to claim 8, wherein the emulation patch comprises a flow control instruction with an address to be used for finding the emulation routine, the flow control instruction selected from a group consisting of:
    a call instruction;
    a jump instruction; and
    a branch instruction.

11. A processing system according to claim 8, wherein the emulation patch comprises an instruction selected from the group consisting of:
    a break instruction;
    a branch instruction;
    a call instruction; and
    a jump instruction.

12. A processing system according to claim 8, wherein the instructions perform operations comprising:
   determining an index, based at least in part on data produced by the emulation patch; and
   using the index into the emulation map to find the emulation routine to be executed.

13. A processing system according to claim 8, wherein the instructions cause the processing system to perform operations comprising:
   in response to execution of the emulation patch, finding and executing the emulation routine for the guest instruction without decoding the guest instruction.

14. An apparatus to support virtual machines, the apparatus comprising:
   a tangible machine accessible medium; and
   instructions in the tangible machine accessible medium, wherein the instructions, when executed by a processing system, cause the processing system to perform operations comprising:
   automatically determining whether a guest instruction of a guest virtual machine (VM) of the processing system is to be patched for emulation, based at least in part on a list of instructions to be patched, the list of instructions stored in a template map that further stores code templates;
   retrieving a code template from the template map that corresponds to the guest instruction to be patched, the code template including an instruction template;
   generating an emulation routine for emulating the guest instruction, including modifying the code template based on characteristics of the guest instruction, storing the emulation routine in an emulation database, assigning a value to the emulation routine, and storing an association of the emulation routine with the value in an emulation map;
   executing an emulation patch for the guest instruction, the emulation patch including data to facilitate identification of the emulation routine for emulating the guest instruction;
   in response to execution of the emulation patch, transferring control from the guest VM to a virtual machine monitor (VMM) without saving contextual data that defines a system state for the guest VM; and
   using the data to find an emulation routine for the guest instruction.

15. An apparatus according to claim 14, wherein the emulation patch comprises an instruction with an immediate value, the immediate value to be used for finding the emulation routine.

16. An apparatus according to claim 14, wherein the emulation patch comprises a flow control instruction with an address to be used for finding the emulation routine, the flow control instruction selected from a group consisting of:
   a call instruction;
   a jump instruction; and
   a branch instruction.

17. An apparatus according to claim 14, wherein the emulation patch comprises an instruction selected from the group consisting of:
   a break instruction;
   a branch instruction;
   a call instruction;
   a jump instruction.

18. An apparatus according to claim 14, wherein the instructions perform operations comprising:
   determining an index, based at least in part on data produced by the emulation patch; and
   using the index into the emulation map to find the emulation routine to be executed.

19. An apparatus according to claim 14, wherein the instructions perform operations comprising:
   inserting the emulation patch in response to a determination that the guest instruction is to be patched.

20. An apparatus according to claim 14, wherein the instructions, when executed, cause the processing system to perform operations comprising:
   in response to execution of the emulation patch, finding and executing the emulation routine for the guest instruction without decoding the guest instruction.

* * * * *